J. BARKER.
Hay Tedder.
No. 231,980.        Patented Sept. 7, 1880.
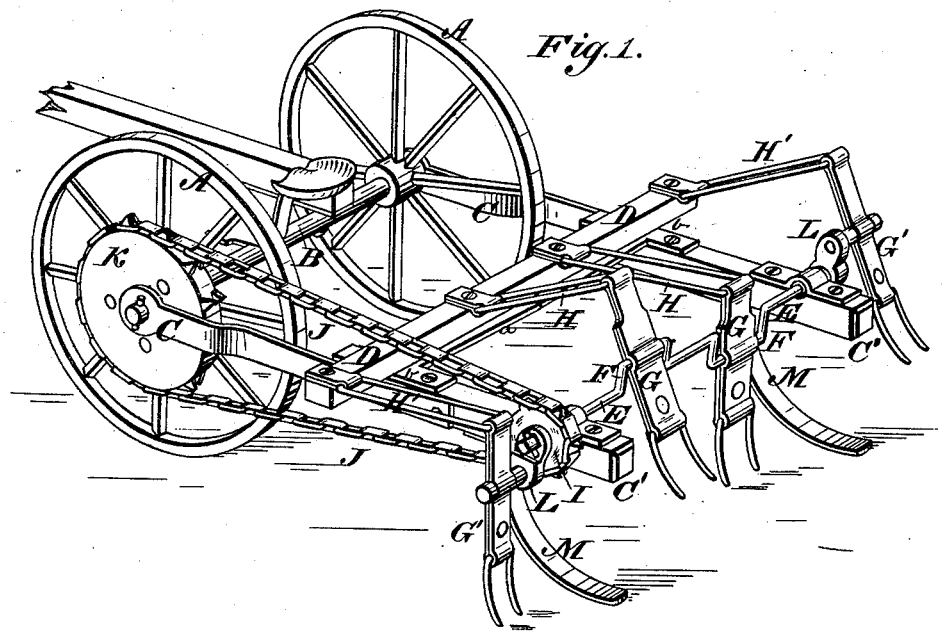
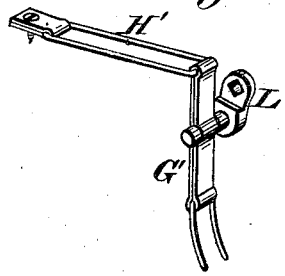
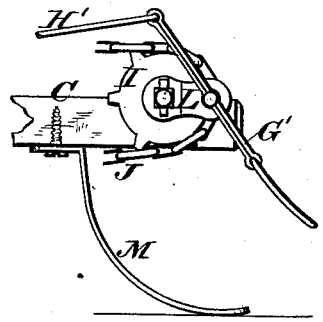
WITNESSES:
C. Sedgwick
James M. Henley
INVENTOR:
J. Barker
BY Munn & Co
ATTORNEYS.

UNITED STATES PATENT OFFICE.

JOSEPH BARKER, OF WELLSBOROUGH, PENNSYLVANIA, ASSIGNOR TO HIMSELF AND DAVID H. BELCHER, OF SAME PLACE.

HAY-TEDDER.

SPECIFICATION forming part of Letters Patent No. 231,980, dated September 7, 1880.

Application filed November 25, 1879.

*To all whom it may concern:*

Be it known that I, JOSEPH BARKER, of Wellsborough, in the county of Tioga and State of Pennsylvania, have invented a new and useful Improvement in Hay-Tedders, of which the following is a specification.

Figure 1 is a perspective view of my improvement. Fig. 2 is a perspective view of one of the side forks. Fig. 3 is a side view of one of the runners.

Similar letters of reference indicate corresponding parts.

The object of this invention is to furnish hay-tedders so constructed that they may be connected with and driven from the wheels and axle of a mowing-machine or the wheels and axle of an ordinary vehicle.

A are two wheels, and B is their axle, which may be the wheels and axle of a mowing-machine, the wheels and axle of a wagon or other vehicle, or a set made expressly for this machine.

C' C' represent the longitudinal bars of the tedder-frame, to the front ends of which are secured, by screws or otherwise, the end plates, *b b*, of the metallic I-shaped plate *a*, which securely connects the front ends of the bars C' C'. A cross-bar, D, extends over and in contact with the I-shaped plate *a*, and is secured thereto. The cross-bar D extends a sufficient distance on each side of the longitudinal bars at its ends to allow space for the attachment of a link connected with a tedder-fork.

C C represent metallic plates secured to the side faces of the longitudinal bars C' at one end, and provided at their opposite ends with holes adapted to fit over the ends of the main axle of the harvester and to be secured thereto by pins, as clearly shown in the drawings, by which construction it will be seen that the tedder-frame can readily be attached to or detached from the axle of the harvester without removing its wheels or any part of the harvester.

E represents a crank-shaft, having its bearings in the longitudinal bars C'. Upon the shaft E, between the rear ends of the bars C', are formed two or more cranks, F, projecting in opposite directions, and to which are pivoted the forks G in such positions that their prongs may just clear the ground. To the upper ends of the forks G are hinged the rear ends of the long links H, the forward ends of which are hinged to the cross-bar D. With this construction, as the machine is drawn forward the forks G rise, pass forward, descend, and pitch the hay to the rearward, leaving it loose, so that the air can readily pass through it.

To one end of the crank-shaft E F is attached a chain-wheel, I, around which passes an endless chain, J. The endless chain J also passes around a larger chain-wheel, K, attached to one of the wheels A, so that the crank-shaft E F may be revolved to operate the forks G by the forward movement of the machine. In case the hay is wet cranks L may be attached to the ends of the crank-shaft E F and provided with forks and links G' H'.

To the under sides of the bars C', at a little distance from their rear ends, are pivoted the upper ends of two bars, M, which are curved, as shown in the drawings, so that they may serve as runners to support the rear end of the machine. With this construction the passage of the wheels A over uneven ground will not raise the forks G above the hay or lower them so that they will strike the ground.

I am aware that a crank-shaft journaled in a frame and provided with tedder-forks pivoted to the cranks and connected by links to the front cross-bar of the frame, the crankshaft being operated by gearing or sprocket wheels and an endless chain connecting the axle of the drive-wheel with the crank-shaft, has heretofore been employed, and I therefore lay no claim to such construction, my invention being confined to the precise construction shown and claimed by me, whereby the tedder-frame is strengthened and braced, and whereby the tedder can readily be attached to or detached from the axle of a harvester without removing the wheels or any parts of the harvester or tedder.

Having thus described my invention, I claim as new and desire to secure by Letters Patent—

The combination, with the axle B and wheels A A of a mowing-machine, one of which is provided with a sprocket-wheel, K, of a tedder-frame having the longitudinal bars C', I-shaped bar *a* secured thereto, cross-bar D, having both ends projecting over the bars C', connecting metallic plates C, having holes in their front ends adapted to receive the ends of the axle B, crank-shaft E, forks G, pivoted to the cranks of the crank-shaft, links L, sprocket-wheel I, endless chain J, and pivoted runners M, the whole constructed, arranged, and operated in the manner and for the purpose set forth.

JOSEPH BARKER.

Witnesses:
C. E. BREWSTER,
L. R. SPENCER.